(12) United States Patent
Birkmayer (10) Patent No.: US 11,289,901 B2
(45) Date of Patent: Mar. 29, 2022

(54) AIRCRAFT COMPRISING A DIRECT CURRENT ELECTRICAL NETWORK AND A PROTECTION SYSTEM FOR SAID NETWORK

(71) Applicant: AIRBUS OPERATIONS (S.A.S.), Toulouse (FR)

(72) Inventor: Wolfram Birkmayer, Colomiers (FR)

(73) Assignee: Airbus Operations (S.A.S.), Toulouse (FR)

( * ) Notice: Subject to any disclaimer, the term of this patent is extended or adjusted under 35 U.S.C. 154(b) by 364 days.

(21) Appl. No.: 16/074,182

(22) PCT Filed: Feb. 17, 2017

(86) PCT No.: PCT/EP2017/053580
§ 371 (c)(1),
(2) Date: Jul. 31, 2018

(87) PCT Pub. No.: WO2017/144353
PCT Pub. Date: Aug. 31, 2017

(65) Prior Publication Data
US 2021/0135449 A1    May 6, 2021

(30) Foreign Application Priority Data
Feb. 23, 2016  (FR) ...................................... 1651464

(51) Int. Cl.
*H02H 7/26*   (2006.01)
*B64D 47/00*  (2006.01)
(Continued)

(52) U.S. Cl.
CPC ............. *H02H 7/268* (2013.01); *B64D 47/00* (2013.01); *H02H 3/025* (2013.01); *H02H 9/02* (2013.01); *B64D 2221/00* (2013.01)

(58) Field of Classification Search
CPC .......... H02H 7/268; H02H 3/025; H02H 9/02; B64D 47/00; B64D 2221/00
(Continued)

(56) References Cited

U.S. PATENT DOCUMENTS 9,007,735 B2 *  4/2015  Park ....................... H02H 7/268
                                                       361/67
2013/0286521 A1 * 10/2013  Park ....................... H02H 3/066
                                                       361/57

FOREIGN PATENT DOCUMENTS

EP   2 442 417           4/2012
EP      2442417 A1 *     4/2012    ............. H02H 3/081
(Continued)

OTHER PUBLICATIONS

International Search Report for PCT/EP2017/053580 dated May 19, 2017, three pages.

*Primary Examiner* — Yemane Mehari
(74) *Attorney, Agent, or Firm* — Nixon & Vanderhye P.C.

(57) ABSTRACT

A direct current electrical network includes nodes linked by branches and protection elements mounted on the branches, each protection element includes a central processing unit, a current sensor, a current limiter device and a circuit breaking device, wherein: the current sensor is configured to determine the direction of the current in the branch relative to the node with which said protection element is associated; the central processing unit is configured to select, as a function of the direction of the current, a selected threshold value as one of a first value or a second threshold value greater than the first threshold value in absolute value, and to compare the value of the intensity of the current to the selected threshold value; and the current limiter device is bidirectional and is configured to limit the current passing through the branch to the selected threshold value.

14 Claims, 6 Drawing Sheets

(51) Int. Cl.
*H02H 9/02* (2006.01)
*H02H 3/02* (2006.01)

(58) Field of Classification Search
USPC .......................................... 361/91
See application file for complete search history.

(56) References Cited

FOREIGN PATENT DOCUMENTS

| | | | |
|---|---|---|---|
| EP | 2 910 959 | 8/2015 | |
| WO | 2012/123015 | 9/2012 | |
| WO | WO-2012123015 A1 * | 9/2012 | ............... H02H 9/02 |
| WO | 2013/131782 | 9/2013 | |

* cited by examiner

AIRCRAFT COMPRISING A DIRECT CURRENT ELECTRICAL NETWORK AND A PROTECTION SYSTEM FOR SAID NETWORK

RELATED APPLICATION

This application is a U.S. national phase of International Application PCT/EP2017/053580 filed Feb. 17, 2017, which designated the U.S. and claims priority to French Patent Application No. 1651464 filed Feb. 23, 2016, the entire contents of each of which are hereby incorporated by reference.

BACKGROUND AND SUMMARY OF INVENTION

The present invention relates to an aircraft comprising a direct current electrical network and a protection system for said electrical network.

High-voltage direct current (HVDC) networks are used to transport electricity or to supply electricity in vehicles, in particular aircraft. Such a network comprises a plurality of nodes linked together by branches and some or all of the nodes are also linked to an electrical element (electrical source or user equipment).

Generally, a direct current electrical network is protected from any short circuits or any other abrupt change of the intensity of the current in a branch of the network by a protection system comprising a plurality of protection elements, with a protection element mounted on each branch. The protection elements are, for example, limiters/circuit breakers configured to limit the value of the intensity in a defective branch to a predetermined threshold value for a predetermined time and then to break the passage of the current in said branch if necessary in order to isolate it from the healthy branches. The protection elements are all identical in their technology and all have the same threshold value.

Such a protection system is effective in protecting the electrical network. However, as described hereinbelow with reference to FIG. 1, because of the distribution of the current in the network, a healthy line linked to the same node as a defective line is isolated accidentally.

Figure 1:
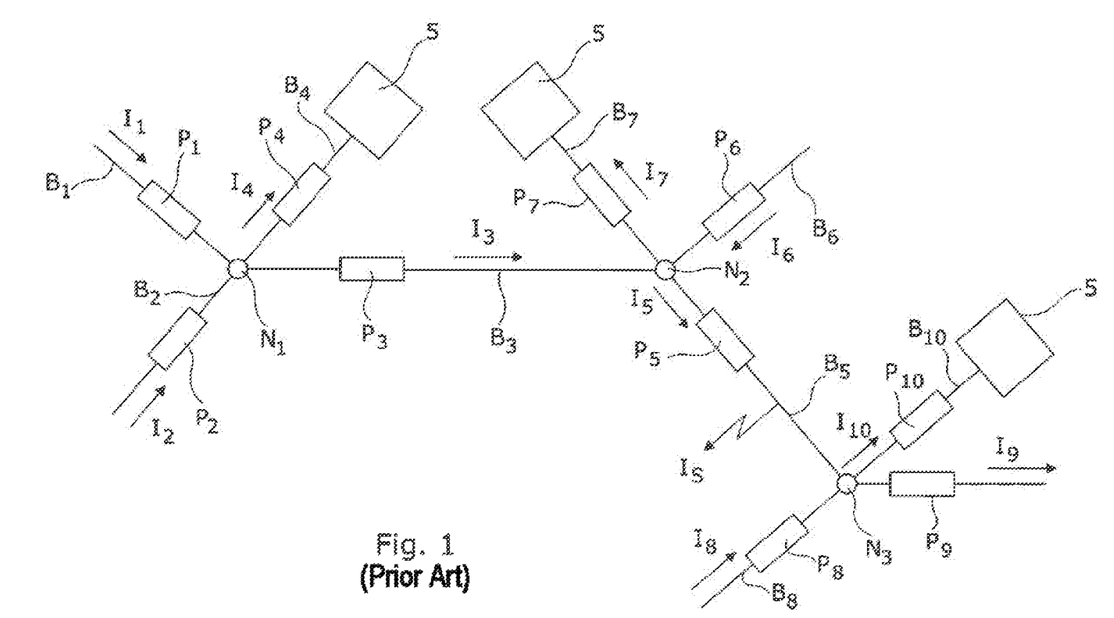
FIG. 1, already described, schematically illustrates the operation of a protection system for a portion of a direct current electrical network affected by a short-circuit according to the prior art.

FIG. 1 describes a portion of a direct current electrical network comprising three nodes $N_1$, $N_2$ and $N_3$ linked together and to user equipment 5 by several branches $B_1$-$B_{10}$. The node $N_1$ is linked to the node $N_2$ by the branch $B_3$, and the node $N_2$ is linked to the node $N_3$ by the branch $B_5$. A protection system for the electrical network comprises protection elements $P_1, \ldots, P_j, \ldots, P_{10}$ mounted respectively on the different branches $B_i, \ldots, B_j, \ldots, B_{10}$.

A current $I_1$ and a current $I_2$ enter into the node $N_1$ via a branch $B_1$, respectively $B_2$. The current $I_4$ leaves the node $N_1$ and enters into the branch $B_4$ which links the node $N_1$ to a user equipment item 5 and the current $I_3$ leaves the node $N_1$ by the branch $B_3$.

The current $I_3$ and a current $I_6$ in the node $N_2$ via the branch $B_3$, respectively a branch $B_6$ linking the node $N_2$ to a user equipment item 5. The current $I_7$ leaves the node $N_2$ via the branch $B_7$ which links the node $N_2$ to a user equipment item 5 and the current $I_5$ leaves the node $N_2$ by the branch $B_5$.

The current $I_5$ and a current $I_8$ enter into the node $N_2$ via the branch $B_5$, respectively a branch $B_{10}$ linking the node $N_3$ to a user equipment item 5. The current $I_9$ leaves the node $N_3$ via the branch $B_9$.

By applying the law of the nodes to each of the nodes $N_1$, $N_2$ then $N_3$, the equations $I_3=I_1+I_2-I_4$; $I_5=I_3+I_6-I_7$; $I_9=I_5+I_8-I_{10}$ are respectively obtained.

Assume that the impedance in the branch $B_5$ is very much lower than that in the branch $B_3$ and that a short-circuit $I_s$ appears in the branch $B_5$ between the nodes $N_2$ and $N_3$. Before the short-circuit, the current intensity $I_5$ in the branch $B_5$ is very much lower than the current intensity $I_3$ in the branch $B_3$ ($I_5<I_3$) and, after the short-circuit, the current intensity in the branch $B_5$ is $I_{51}=I_5+I_s$ and the current intensity in the branch $B_3$ is $I_{31}=I_3+I_s$.

Given that at the outset $I_5<I_3$, the predetermined threshold value is reached more rapidly by the value of the current intensity in the branch $B_3$ than by that in the branch $B_5$ and, consequently, the protection element $P_3$ of the branch $B_3$ detects the short-circuit before the protection element $P_5$ of the branch $B_5$. Consequently, it is the passage of the current in the non-defective branch $B_3$ which will be cut. This example clearly illustrates a case where a healthy branch has been isolated incorrectly instead of only isolating that which is actually defective.

The object of the present invention is, consequently, to remedy the abovementioned drawbacks by proposing a protection system for a direct current electrical network that makes it possible to easily detect and identify the electrical overcurrents and to disconnect only the defective line.

To this end, the invention relates to an aircraft comprising at least one direct current electrical network, said network comprising nodes linked together in pairs by branches, each node being connected to at least two branches, said network being protected by a protection system comprising a plurality of protection elements mounted on the branches, each protection element mounted on a branch comprising a central processing unit associated with a current sensor configured to measure the value of the intensity of the current in the branch, with a current limiter device controlled by the central processing unit to limit the current passing through the branch and with a circuit breaking device controlled by the central processing unit to cut the passage of the current, for each branch of the network linking two nodes, the protection system comprises two protection elements mounted in series on the branch, where each protection element adjacent to a node is said to be associated with that node, and for each protection element of the protection system mounted on a branch:

the current sensor is, in addition, configured to determine the direction of the current in the branch relative to the node with which said protection element is associated, the direction being determined from a first direction in which the current enters into the branch by the node with which said protection element is associated, and a second direction in which the current leaves the branch by the node with which said protection element is associated;

the central processing unit is configured to select, as a function of the direction of the current determined by the current sensor, a threshold value, called selected threshold value, taken from a first value or a second threshold value greater than the first threshold value in absolute value, and to compare the value of the intensity of the current to the selected threshold value; and the current limiter device is bidirectional and is configured to limit the current passing through the branch to the threshold value selected by the central processing unit.

According to the invention, each node of the network is linked to elements of the network by at least two branches, with a protection element associated with the node (that is to say adjacent to the node) on each of the branches connected to the node.

A protection element mounted on one of the branches connected to a node with which it is associated limits the value of the intensity of the current leaving the branch by the node to a first threshold value and limits the value of the intensity of the current entering into the branch by the node to a second threshold value which is greater, in absolute value, than the first threshold value.

As long as there is no fault current (due to a short-circuit) outside the node, the value of the intensity of the current leaving a branch by the node is always limited to the first threshold value by the protection element mounted on that branch and associated with said node.

In the case of presence of a fault current on a defective branch connected to the node, the value of the intensity of the current entering into said branch by the node is limited to the second threshold value by the protection element mounted on that branch and associated with said node. Then, the passage of the current is possibly interrupted after a predetermined time if the fault current is still present on the defective branch in order to protect the electrical network.

Other advantages and features of the invention will emerge from the nonlimiting detailed description hereinbelow. This description will be given in light of the attached drawings in which.

Figure 2:
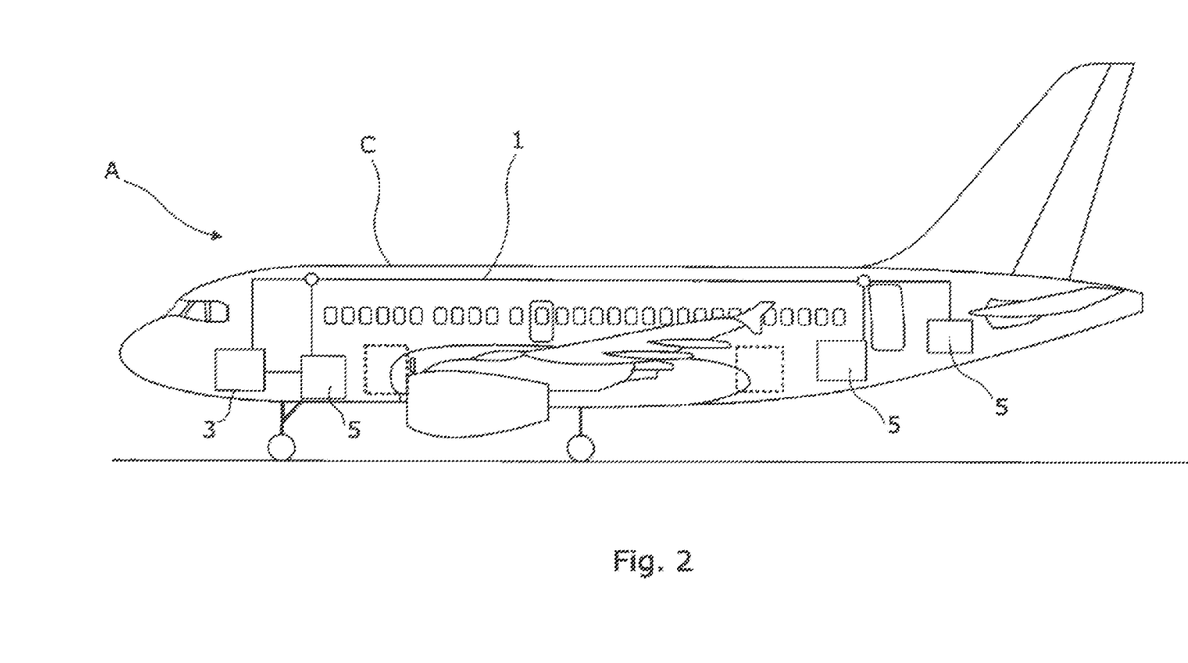
FIG. 2 represents an aircraft comprising a direct current electrical network according to an embodiment of the invention.
Figure 3:
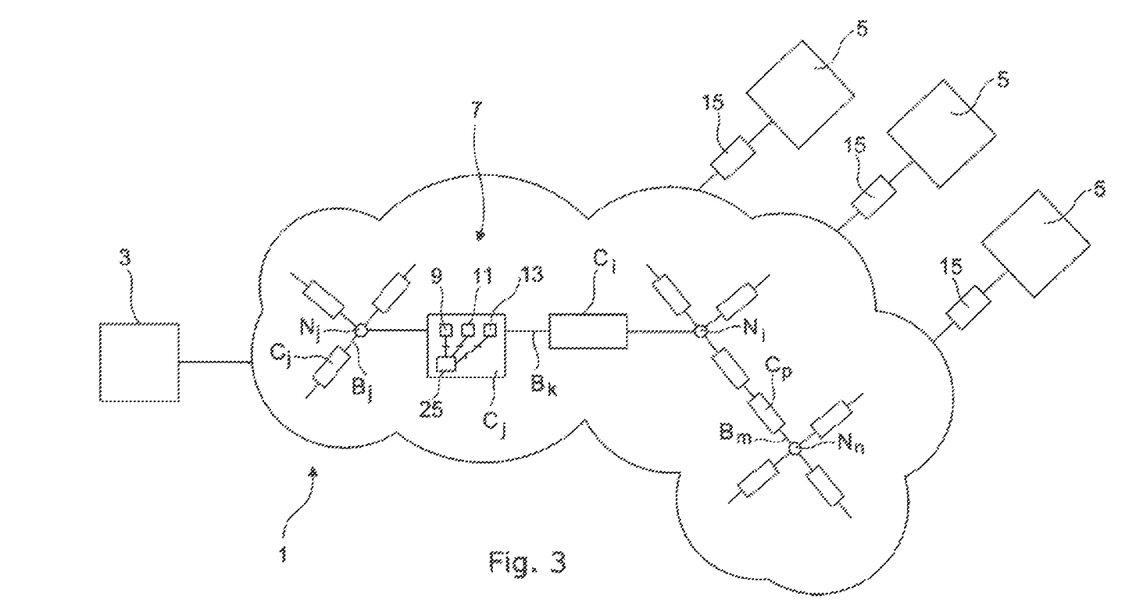
FIG. 3 is a diagram of the direct current electrical network of FIG. 2, said network being protected by a protection system comprising a plurality of protection elements, according to a preferred embodiment of the invention.

Concerning FIGS. 2 and 3, an aircraft A comprises a high-voltage direct current (HVDC) electrical network 1 arranged in its fuselage C. The electrical network 1 makes it possible to link at least one electrical generator 3 (only one is represented in FIG. 2) to a plurality of user equipment items 5 so as to ensure the transport of the direct current from the electrical generator or generators 3 to the different user equipment items 5.

The electrical network 1 comprises nodes $N_1 \ldots, N_i \ldots, N_n$ linked together, in pairs, by branches $B_1 \ldots, B_k \ldots, B_m$ (or cables). Some nodes are also linked, by branches, to an electrical generator 3 and/or to a user equipment item 5.

As is known, the direct current electrical network 1 comprises a protection system 7 configured to detect any abrupt change in the intensity of the current in the electrical network 1 and identify a branch affected by an electrical fault (for example a short-circuit) in order to disconnect it if necessary.

Referring to FIG. 3, the protection system 7 comprises a plurality of protection elements $C_i, \ldots, C_j \ldots, C_p$ mounted in the different branches.

According to the invention, on each branch $B_k$ linking two nodes $N_j$ and $N_i$ together, a first protection element $C_j$ and a second protection element $C_i$ are mounted in series. Each protection element adjacent to a node is said to be associated with that node, thus, the first protection element $C_j$ is associated with the node $N_j$ and the second protection element is associated with the node $N_i$.

Each protection element associated with a node is configured to:
measure parameters of the current flowing in the branch $B_k$ on which it is mounted, in particular the value of the intensity of the current and its direction relative to the node with which it is associated;
select, as a function of the direction of the current, a threshold value taken from a first threshold value $S_1$ or a second threshold value $S_2$ greater than the first threshold value $S_1$ in absolute value;
compare the value of the intensity of the current to the selected threshold value;
limit the current to the selected threshold value;
and possibly cut the passage of the current in the branch.

Figure 4:
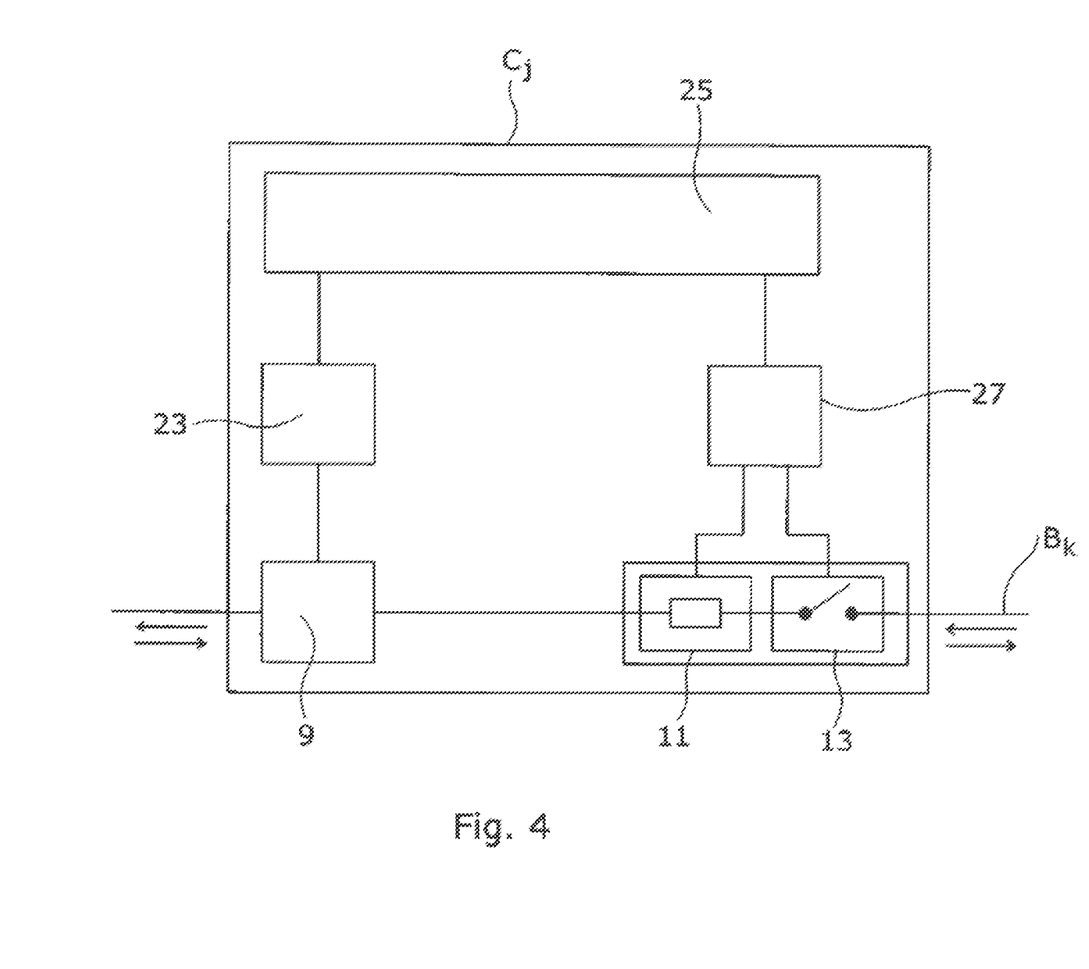
FIG. 4 is a detailed diagram of a protection element of FIG. 3, according to an embodiment of the invention.

A protection element $C_j$ associated with a node $N_1$, as illustrated in FIG. 4, is for example an electronic unit mounted on a branch $B_k$ and which comprises a central processing unit 25 linked to a current sensor 9 to measure parameters of the current passing through the branch $B_k$, to a bidirectional current limiter device 11 and to a circuit breaking device 13. The current limiter device 11 and the circuit breaking device 13 are designed to, respectively, on receipt of a limiting signal emitted by the central processing unit 25, limit the value of the current passing through the branch $B_k$ to the selected threshold value and, possibly, to, on receipt of a cutoff signal emitted by the central processing unit 25, cut the passage of the current passing the branch $B_k$.

The current sensor 9 is configured to measure the algebraic value of the intensity of the current, the latter being assigned a sign (+ or −) as a function of the direction of the current. By convention hereinafter in the description, and by way of example only, the current sensor 9 of a protection element $C_j$ associated with the node $N_j$ and mounted on a branch $B_k$ has a positive sign (+) if the current leaves the branch $B_k$ by the node $N_j$, and has a negative sign (−) if the current enters into the branch $B_k$ by the node $N_j$.

The current sensor 9 transmits a signal comprising the algebraic value of the measured current and its sign to the central processing unit 25 (via an analog-digital converter 23 if necessary).

The central processing unit 25 is, for example, a microcontroller, comprising a processor, memories, a clock, as well as peripheral units and input-output interfaces via which it is connected to the different components of the protection element.

Two threshold values $S_1$, $S_2$ are stored in the memories of the central processing unit 25. The first threshold value $S_1$ is used as threshold value by the central processing unit 25 for a positive current direction (current leaving the branch $B_k$ by the associated node), whereas the second threshold value $S_2$, strictly greater in absolute value than the first threshold value $S_1$, is used as threshold value for a negative current direction (current entering the branch $B_k$ by the associated node). Furthermore, for each threshold value $S_1$, $S_2$, a predetermined time $T_1$, $T_2$ is stored in the memories of the central processing unit, with first predetermined time $T_1$ associated with the first threshold value $S_1$ and the second predetermined time $T_2$ associated with the second threshold value $S_2$.

Based on the sign of the current which is included in the signal emitted by the current sensor 9 to the central processing unit 25, the central processing unit 25 compares the value of the intensity of the current to the threshold value used, either the first threshold value $S_1$ or the second threshold value $S_2$.

If the result of the comparison indicates that the current measured by the current sensor 9 is greater than the threshold value used, the central processing unit 25 emits (via a digital-analog converter 27 if necessary) a limiting signal to the current limiter device 11 to limit the intensity of the current in the branch $B_k$ to the threshold value used, and engages a countdown via its clock to time a predetermined time equal to the first predetermined time $T_1$ if the threshold value used is the first threshold value $S_1$ or to the second predetermined time $T_2$ if the threshold value used is the second threshold value $S_2$.

At the end of the predetermined time $T_1$ or $T_2$, the current limiter device 11 is no longer activated (the limiting signal is no longer emitted) by the central processing unit 25 and no longer limits the current in the branch $B_k$.

If, after the predetermined time $T_1$ or $T_2$, the result of the comparison performed by the central processing unit 25 indicates that the current measured by the current sensor 9 is still greater than the threshold value used ($S_1$ or $S_2$ as a function of the sign of the current), the central processing unit 25 emits (via the digital-analog converter 27 if necessary), a cutoff signal to the circuit breaking device 13 to cut the passage of current in the branch $B_k$ and isolate it from the other healthy branches.

As described above, the current limiter device 11 is bidirectional in that it is capable of limiting and configured to limit the current intensity in the branch $B_k$ to a different value as a function of the direction of the current, either to the first threshold value $S_1$ for a positive current or to the second threshold value $S_2$ for a negative current. The practical production of the bidirectional current limiter device is within the scope of the person skilled in the art, and, for example, such an element uses semiconductor technology and consists of two depleted-type MOS transistors, head-to-tail, or is an active element consisting of two current sources, head-to-tail, each being associated with a diode ensuring the bidirectional nature of the device.

The circuit breaking device 13 is, for its part, for example, a switch, of transistor type, or even a pyrotechnic circuit breaker, triggered on receipt of the cutoff signal.

As a variant, the functions fulfilled by the current limiter device 11 and the circuit breaking device 13 are performed by a single element essentially comprising a field-effect transistor of MOSFET type. In this case, the MOSFET transistor is configured to be controlled by both the limiting signal and the cutoff signal. In effect, when it is controlled by the limiting signal, the MOSFET transistor is configured to act as a resistor whose resistance can be varied as a function of the threshold value selected by the central processing unit ($S_1$ or $S_2$). When it is controlled by the cutoff signal, the MOSFET transistor is configured to act as a switch to disconnect the branch on which the protection element is mounted.

Figure 5:
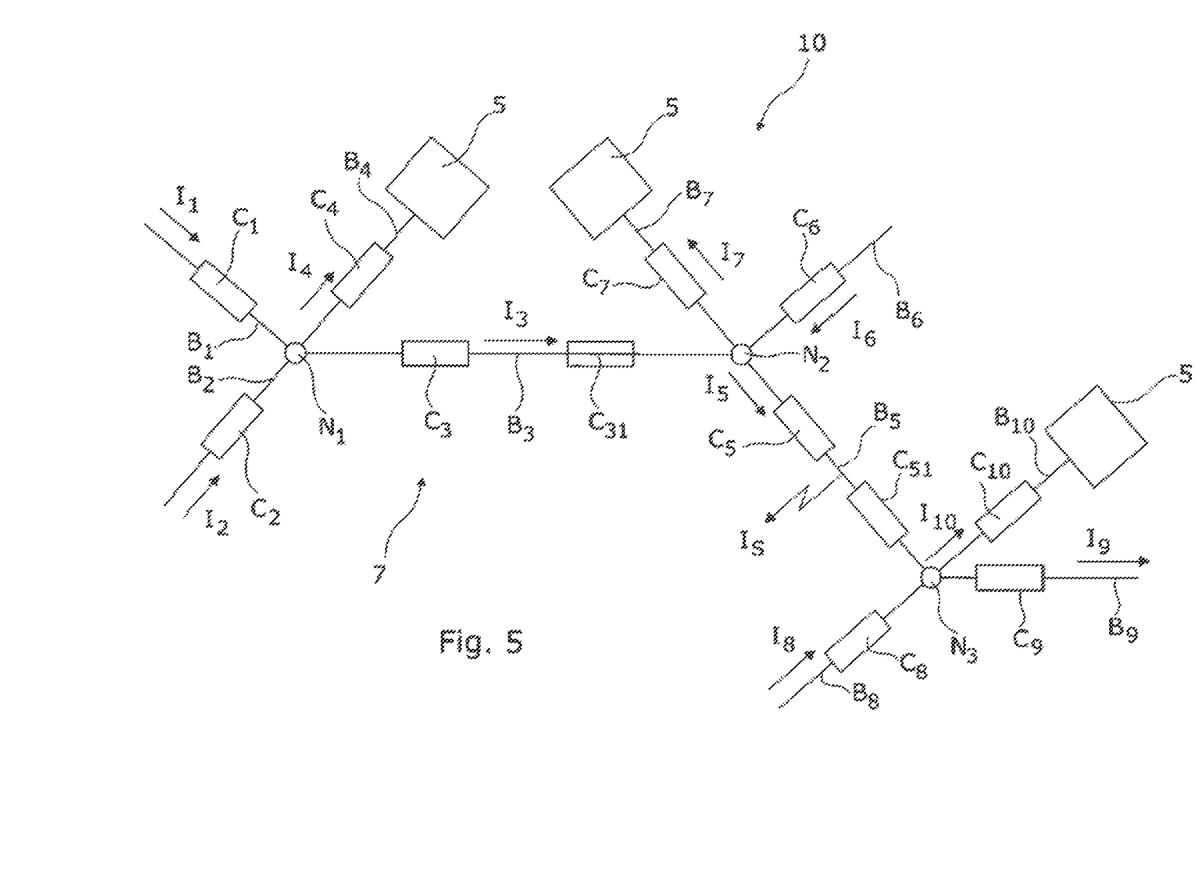
FIG. 5, similar to FIG. 1, schematically illustrates the operation of a protection system for a portion of a direct current electrical network affected by a short-circuit according to an embodiment of the invention.

Referring to FIG. 5, the operation of the protection system 7 according to the present invention will be described for a portion 10 of a direct current electrical network comprising three nodes $N_1$, $N_2$ and $N_3$ linked to one another and to user equipment items 5 by several branches $B_1, \ldots B_k, B_{10}$. The node $N_1$ is linked to the node $N_2$ by the branch $B_3$, and the node $N_2$ is linked to the node $N_3$ by the branch $B_5$.

A current $I_1$ and a current $I_2$ enter into the node $N_1$ via a branch $B_1$, respectively $B_2$. The current $I_4$ leaves the node $N_1$ by the branch $B_4$ which links the node $N_1$ to a user equipment item 5 and the current $I_3$ leaves the node $N_1$ by the branch $B_3$.

The current $I_3$ and a current $I_6$ enter into the node $N_2$ via the branch $b_3$, respectively a branch $B_6$ linking the node $N_2$ to a user equipment item 5. The current $I_7$ leaves the node $N_2$ by the branch $B_7$ which links the node $N_2$ to a user equipment item 5 and the current $I_5$ leaves the node $N_2$ by the branch $B_5$.

The current $I_5$ and a current $I_8$ enter into the node $N_2$ via the branch $B_5$, respectively a branch $B_{10}$ linking the node $N_3$ to a user equipment item 5. The current $I_9$ leaves the node $N_3$ via the branch $B_9$.

Applying the law of the nodes to each of the nodes $N_1$, $N_2$ then $N_3$, the equations $I_3=I_1+I_2-I_4$; $I_5=I_3+I_6-I_7$; $I_9=I_5+I_8-I_{10}$ are respectively obtained.

The protection system 7 comprises protection elements $C_1, \ldots, C_j, \ldots, C_{10}$ mounted on the different branches. Each protection element $C_j$ is associated with a corresponding node $N_i$ (i=1, 2, 3). More particularly, the protection elements $C_1$ (mounted on $B_1$), $C_2$ (mounted on $B_2$), $C_3$ (mounted on $B_3$), $C_4$ (mounted on $B_4$) are associated with the node $N_1$, the protection elements $C_{31}$ (mounted on $B_3$), $C_5$ (mounted on $B_5$), $C_6$ (mounted on $B_6$), $C_7$ (mounted on $B_7$) are associated with the node $N_2$, and the protection elements $C_{51}$ (mounted on $B_5$), $C_8$ (mounted on $B_8$), $C_9$ (mounted on $B_9$), $C_{10}$ (mounted on $B_{10}$) are associated with the node $N_3$. For a protection element $C_j$ associated with a node $N_i$ and mounted on a branch $B_k$, an electrical current leaving the branch $B_k$ by the node $N_1$ (positive direction according to the chosen convention) is limited by the protection element $C_j$ to the first threshold value $S_1$ whereas an electrical current entering into the branch $B_k$ by the node $N_1$ (negative direction according to the present convention) is limited by the protection element $C_j$ to the second threshold value $S_2$, with, in absolute value, $S_1<S_2$.

Thus, each node $N_1$-$N_3$ of the electrical network 1 is linked to components of the network (nodes $N_1$-$N_3$, or user equipment item 5 or possibly electrical generator (not represented in FIG. 5)) by at least two branches $B_1$-$B_{10}$, with a protection element $C_1$-$C_{10}$ associated with the node, that is to say adjacent to the node, mounted on each of the branches connected to the node.

When everything is functioning normally, the protection elements $C_1$-$C_{10}$ are operational only according to the first threshold value $S_1$. In other words, the current intensities are limited by the protection elements $C_1$-$C_{10}$ only in the direction of the positive currents and the second cutoff value $S_2$ is not reached.

Referring to the node $N_2$, in operations similar to the protection elements of the protection systems according to the prior art, in case of overcurrent on the branch $B_3$ carrying the current $I_3$ entering into the node $N_2$, the protection element $C_{31}$ associated with the node $N_2$ limits the current $I_3$ to the first threshold value $S_1$ for the time $T_1$, then, after this time, once again compares the current $I_3$ to this same threshold value $S_1$. If the current $I_3$ is greater than $S_1$, the protection element $C_{31}$ cuts the flow of the current $I_3$ in the branch $B_3$.

In the case where a short-circuit $I_s$ appears in the branch $B_5$ between the nodes $N_2$ and $N_3$ and between the protection elements $C_5$ and $C_{51}$, the intensity of the current in the branch $B_5$ which passes through the protection element $C_5$ becomes $I_5=I_5+I_s$ and the intensity of the current in the branch $B_3$ which passes through the protection element $C_{31}$ becomes $I_{31}=I_3+I_s$.

Referring to the node $N_2$, the current intensity $I_{31}$ passing through the protection element $C_{31}$ is positive whereas the current intensity $I_5$, passing through the protection element $C_5$, is negative. Thus, whatever the order relationship between the initial current intensities $I_3$ and $I_5$ ($I_3 \leq I_5$ or $I_5 < I_3$), the protection element $C_{31}$ associated with the node $N_2$ limits the value of the intensity of the current $I_{31}$ in the branch $B_3$ to the first threshold value $S_1$ whereas the protection element $C_5$ mounted in the branch $B_5$ limits the value of the intensity of the current $I_5$ in the branch $B_5$ to the second threshold value $S_2$. It is then deduced (whatever the impedances in the branches $B_3$ and $B_5$ or whatever the configuration of the circuit) that the short-circuit has occurred in the branch $B_5$ and not in $B_3$ and, consequently, the defective branch is correctly identified.

After a time $T_2$ of limiting of the current $I_5$ of the current in the branch $B_5$ to the second threshold value $S_2$, the central processing unit 25 of the protection element $C_5$ once again compares the value of the intensity of the current $I_5$ to this same threshold value $S_2$ and if said value is greater than the second threshold value $S_2$, the central processing unit 25 emits a cutoff signal to the circuit breaking device 13 to cut the flow of the current in the branch $B_5$ and isolate the latter from the healthy branches.

It will be noted that the time $T_2$ can be nil in the case where the defective branch must be immediately disconnected in order to avoid damaging user equipment items 5 connected to that branch.

Thus, a protection element $C_3$, $C_5$ mounted on one of the branches $B_3$, $B_5$ connected to a node $N_2$ with which it is associated limits the value of the intensity of the current leaving the branch $B_3$ by the node $N_2$ to the first threshold value $S_1$ and limits the value of the intensity of the current entering into the branch $B_5$ by the node $N_2$ to the second threshold value $S_2$ which is greater, in absolute value, than the first threshold value $S_1$.

As long as there is no fault current (due to a short-circuit) outside of the node $N_2$, the value of the intensity of the current leaving a branch $B_3$ by the node $N_2$ is always limited the first threshold value $S_1$ by the protection element $C_3$ mounted on that branch and associated with said node.

In case of the presence of a fault current on a defective branch $B_5$ connected to the node, the value of the intensity of the current entering into said branch $B_5$ by the node $N_2$ is limited to the second threshold value $S_2$ by the protection element $C_5$ mounted on that branch and associated with said node. Then, the passage of the current is possibly interrupted after a predetermined time $T_2$ if the fault current is still present on the defective branch in order to protect the electrical network 1.

Figure 6:
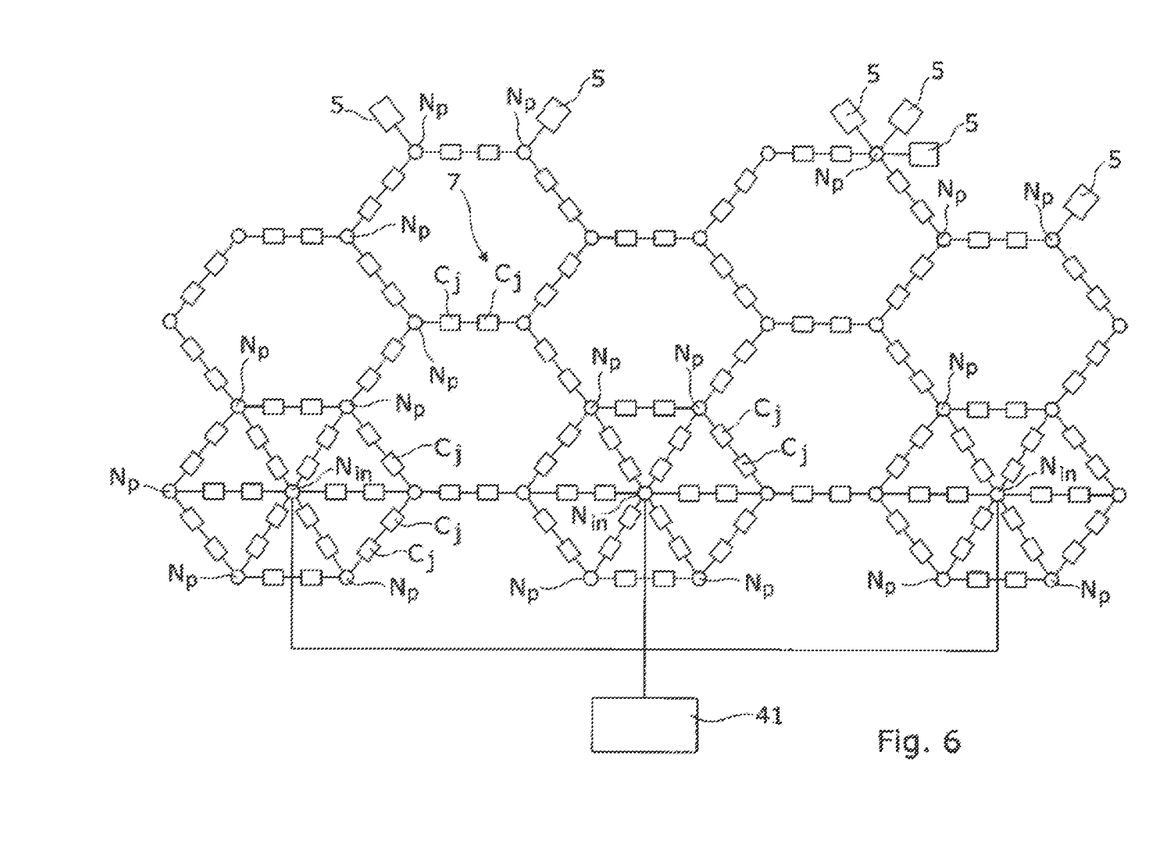
FIG. 6 is a diagram of a meshed direct current electrical network comprising a protection system according to an embodiment of the invention.

Advantageously, and as illustrated in FIG. 6, the direct current electrical network is meshed. According to this embodiment, the direct current electrical network 1 has a net-form structure comprising supply nodes $N_p$ connected pair-to-pair by branches $B_k$. The network 1 is supplied by an HVDC direct current source 41 which outputs a current from injection nodes Nin to user equipment items 5 via the network of supply nodes $N_p$. Several user equipment items 5 can be connected to one and the same supply node $N_p$. Each mesh is, for example, of hexagonal form whose vertices are occupied by the supply nodes $N_p$ and some meshes have an injection node $N_{in}$ at their center. The current is injected by each injection node Nin to the neighboring supply nodes $N_p$ and then from each supply node $N_p$, the current can flow in the different branches $B_k$ according to any one of the two directions of flow depending on the elements or user equipment items 5 started up.

This architecture allows the supply nodes $N_p$ to be linked to one another by numerous paths providing great safety and a great tolerance to failures. In effect, if one path (made up of nodes and branches) is defective, the currents can take the other paths to ensure the continuity of the electrical supply.

Furthermore, the meshed direct current network 1 is protected by the protection system 7 according to the invention. In effect, protection elements $C_j$ are mounted in the different interconnecting branches $B_k$ and protection element $C_j$ is associated with a node in order to rapidly identify and isolate any element (nodes or interconnecting branch) that is defective.

The meshed direct current electrical network 1 is an electrical supply network in an aircraft supplying for example a direct voltage of approximately 270 V DC. The direct electrical current supplied by electrical generators of the aircraft is routed from the injection nodes Nin to the different electrical equipment items 5 of the aircraft via the network of supply nodes $N_p$ and interconnecting branches $B_k$ which is protected by the protection system 7 according to the invention.

Furthermore, the protection elements $C_j$ are mounted in the different interconnecting branches and each protection element is associated with a node (injection or supply) in order to rapidly identify and isolate any defective element. Each protection element associated with a node operates according to a first threshold $S_1$ which can for example be of the order of 8 A for an electrical current leaving a branch by said node and a second threshold value $S_2$ (with $S_1 < S_2$) which can for example, in absolute value, be of the order of 10 A for an electrical current entering into a branch by said node.

As a variant, the branches connected to the user equipment items 5 can comprise simple circuit breakers (not represented) of fusible type which are configured to blow in order to cut the current in the branch when an overcurrent is detected in the branch.

The meshed direct current electrical network thus makes it possible to satisfy the aeronautical needs which are increasingly dictated by particularly severe constraints of safety, reliability and redundancy. Furthermore, the protection system makes it possible to rapidly and accurately identify any defective element, thus ensuring optimal safety on the electrical network of the aircraft.

The invention claimed is:

1. An aircraft comprising at least one direct current electrical network, said network comprising nodes linked together in pairs by branches, each of the nodes being connected to at least two of the branches, said at least one direct current electrical network being protected by a protection system comprising:
   a plurality of protection elements each mounted on a respective one of the branches, each of the protection elements comprising:
   a central processing unit;
   a current sensor configured to measure a value of current in the branch associated with the protection element;
   a current limiter device controlled by the central processing unit to limit the current passing through the branch associated with the protection element, and
   circuit breaking device controlled by the central processing unit to interrupt the current passing through the branch associated with the protection element;

wherein in each of the branches of the network linking two of the nodes, the protection element comprises two protection elements mounted in series on the branch, where each of the two protection elements is associated with the node nearest the protection element, and for each of the two protection elements:

the current sensor is configured to determine a direction of the current in the branch relative to the node associated with which said protection element, the direction being determined as one of a first direction in which the current enters into the branch by the node with which said protection element is associated, and a second direction in which the current leaves the branch by the node with which said protection element is associated;

the central processing unit is configured to select, as a function of the direction of the current determined by the current sensor, a selected threshold value as one of a first value or a second threshold value greater than the first threshold value in absolute value, and to compare the value of the intensity of the current to the selected threshold value; and the current limiter device is bidirectional and is configured to limit the current passing through the branch to the selected threshold value selected by the central processing unit.

2. The aircraft as in claim 1, wherein the central processing unit is configured to select as the selected threshold value the first threshold value if the current sensor indicates that the current is flowing in the second direction, or the second threshold value if the current sensor indicates that the current is flowing in the first direction.

3. The aircraft as in claim 1, wherein the central processing unit comprises a clock and is configured to count down a predetermined time from an instant at which the intensity of the current measured by the current sensor is greater than the selected threshold value, and the central processing unit is configured to send, during the predetermined time, a signal to the current limiter device to limit the current passing through the branch for the predetermined time.

4. The aircraft as in claim 1, wherein the direct current electrical network is a meshed network.

5. A protection system configured to be in a branch of a direct current electrical network of an aircraft, wherein the branch electrically links nodes of the network, and the protection system includes at least one protection element that includes:

a current sensor configured to measure a value and direction of current in the branch;

a current limiter device configured to limit current in the branch, and a processing unit configured to:

receive information from the current sensor indicative of the value and direction of the current in the branch;

select a selected current threshold based on the direction of the current, wherein the selected current threshold is a first current threshold or a second current threshold greater than the first current threshold;

compare the selected current threshold to the value of the current in the branch; and command the current limiter device to limit the current in the branch if the comparison determines that the value of the current exceeds the selected current threshold.

6. The protection system of claim 5 wherein the at least one protection element includes a current breaker and the processing unit is configured to command the current breaker to interrupt current in the branch if current in the branch exceeds the selected current threshold after a certain period following commanding the current limiter device to limit the current in the branch.

7. The protection system of claim 6 wherein the certain period is a first period if the selected current threshold is the first current threshold and is a second period, different from the first period, if the selected current threshold is the second current threshold.

8. The protection system of claim 5, wherein the direct current electrical network is a meshed network including a plurality of branches each having at least one of the protection elements.

9. The protection system of claim 5 wherein the at least one protection element is two protection elements connected in series in the branch.

10. A method to protect a branch of a direct current electrical network of an aircraft, wherein the branch electrically links nodes in the network, the method includes:

measuring current direction and amplitude in the branch;

select a selected current threshold based on the direction of the current, wherein the selected current threshold is either a first current threshold or a second current threshold greater than the first current threshold;

compare the selected current threshold to the value of the current in the branch; and command a current limiter in the branch to limit the current in the branch if the comparison determines that the value of the current exceeds the selected current threshold.

11. The method of claim 10 wherein the steps are performed automatically by a processor receiving information regarding current direction and amplitude from a current sensor in the branch and commanding a current limiter in the branch.

12. The method of claim 10 further comprising interrupting current in the branch if the current in the branch exceeds the selected current threshold after a certain period following commanding the current limiter to limit the current in the branch.

13. The method of claim 12 wherein the certain period is a first period if the selected current threshold is the first current threshold and is a second period, different from the first period, if the selected current threshold is the second current threshold.

14. The protection system of claim 12, wherein the direct current electrical network is a meshed network including branches each linking a different pair of nodes and each including at least one protection element configured to perform the steps of claim 12.

* * * * *